March 17, 1964     H. C. LERNER     3,125,055

SOLDERING TIP

Filed March 1, 1960

INVENTOR
HENRY C. LERNER

BY Gene W. Arant.

ATTORNEY

3,125,055
SOLDERING TIP
Henry C. Lerner, 1220 Sunset Plaza Drive,
Los Angeles 46, Calif.
Filed Mar. 1, 1960, Ser. No. 12,193
2 Claims. (Cl. 113—105)

The present invention relates to soldering tips, and particularly to soldering tips for use in electric soldering irons.

In the conventional soldering tips for use in electric soldering irons a copper rod is utilized having a supporting shank which is received within the electric soldering iron, and a forward or working portion with which the solder is melted and manipulated for purpose of application in a desired manner. Good heat conduction from the electric iron through the supporting shank and hence into the forward or working part of the soldering tip is quite essential, in order to provide sufficient heat with which to melt the solder.

One difficulty which has been experienced with these conventional soldering tips is that during soldering operations the heat flowing through the copper shank of the soldering tip causes radial expansion of the shank, with the result that the shank tends to adhere or stick within the retaining surface of the electric iron. Also, the high temperatures achieved during soldering operations cause the copper shank to oxidize rather rapidly so that heavy scaling of the shank occurs within the retaining surface of the electric iron. This, likewise, results in the shank sticking within the electric iron. The scaling gives rise to a lower efficiency in the heat transfer from the electric iron to the shank of the soldering tip. It has therefore been necessary for the worker to remove the soldering tip from the electric iron at least one or twice daily, in order to prevent the sticking action from progressing too far, and also to permit partially removing the scaling from the shank. When the worker forgets to periodically remove the tip it "freezes" within the soldering iron, with distressing consequences.

Another difficulty traditionally encountered with various types of soldering tips, whether used with electric irons or not, has been the tendency for the surface to corrode. Presence of the corroded material not only interferes with efficient physical manipulation of the molten solder but also injects impurities therein. Various types of coatings have heretofore been used to protect the working surface of the copper tip but previous efforts along this line have not met with success. One difficulty experienced with coating materials is that the coating melts and becomes assimilated with the molten solder. Another difficulty is that the molten solder, being in a relatively liquid state, diffuses through the coating material into the solid copper portion of the implement, with resultant corrosive action occurring. A further difficulty experienced with coatings has been that the presence of the coating has reduced the heat transfer capabilities of the soldering tip to the extent that only an inadequately small quantity of solder may be maintained in a molten state. Finally, the coatings heretofore used have simply been too expensive in view of the very limited useful life of the soldering tip.

One object of the invention, therefore, is to provide an improved soldering tip for use in electric soldering irons, which can be used continuously over long periods of time without exhibiting any tendency to stick within the iron.

Another object of the invention is to provide a soldering tip having an improved construction of its working part whereby a long useful life of the soldering tip is obtained.

A further object of the invention is to provide a soldering tip having a coated working surface whose physical and chemical nature is such that solder is easily attracted, easily melted and easily manipulated thereby.

An additional object of the invention is to provide various improvements in soldering tips which substantially increase the economy and efficiency of manually performed industrial soldering operations.

The above and other objects and advantages of the invention will be more readily understood from the following description considered in conjunction with the accompanying drawing, in which.

Figure 1:
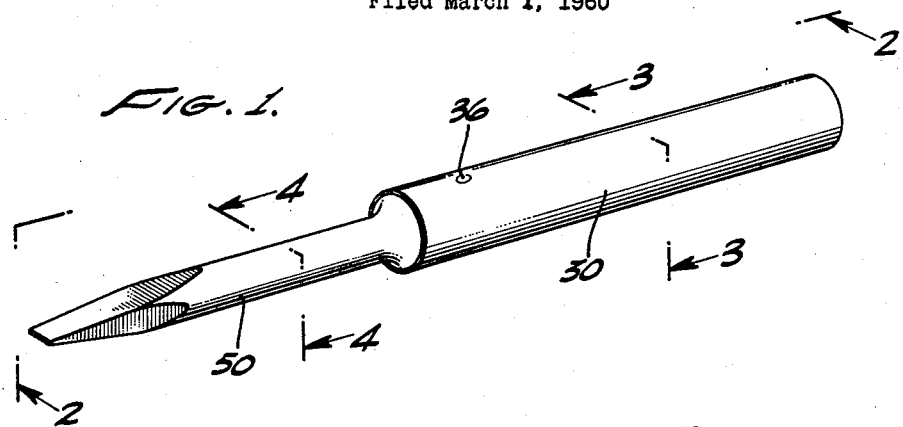
FIGURE 1 is a perspective view of a soldering tip in accordance with my invention.
Figure 2:
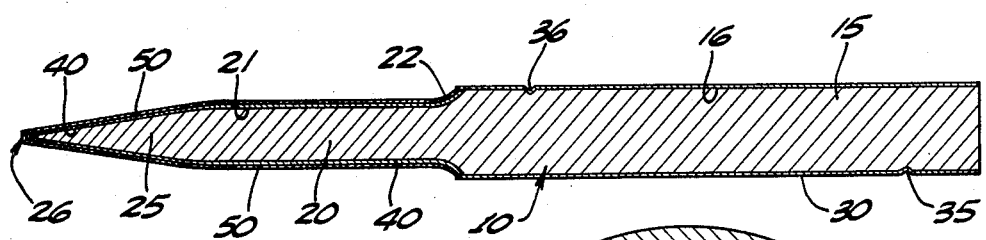
FIGURE 2 is a longitudinal cross-sectional view of the soldering tip taken on the line 2—2 of FIGURE 1.
Figure 3:
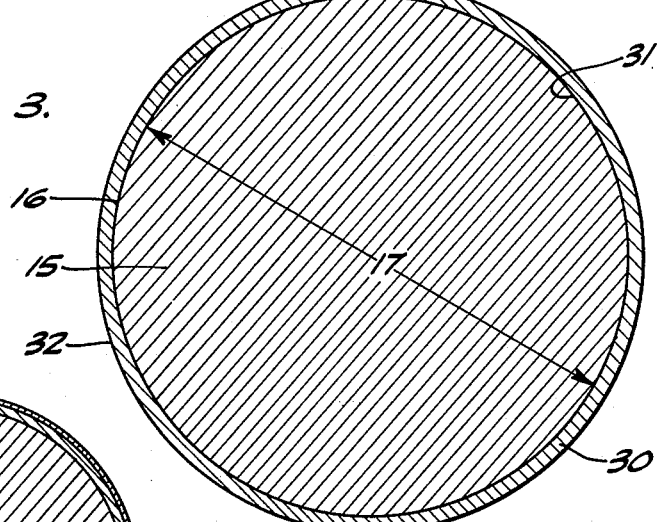
FIGURE 3 is a transverse cross-sectional view of the soldering tip taken on the line 3—3 of FIGURE 1.
Figure 4:
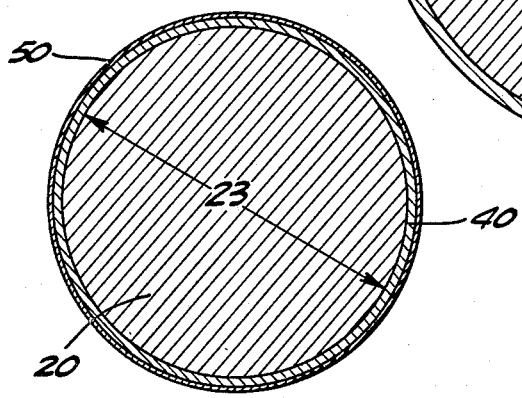
FIGURE 4 is a transverse cross-sectional view of the soldering tip taken on the line 4—4 of FIGURE 1.

Before describing the invention in detail it will be advantageous to explain that two separate and distinct improvements in the field of soldering equipment are involved. One improvement applies only to the field of soldering tips for electric soldering irons, and consists in the provision of an improved type of construction of the supporting shank, which possesses the required degree of heat conductivity and other necessary characteristics but does not tend to stick or "freeze" within the soldering iron. The other improvement relates to the working part of a soldering tip that physically contacts the solder, and consists in a novel surface coating for the solid copper applicator; the usefulness of this latter improvement being not necessarily limited to the field of soldering tips for electric irons.

Referring now to the drawing it will be seen that the principal structural element of my improved soldering tip is an elongated solid copper rod 10. Approximately two-thirds of the length of copper rod 10 is devoted to a supporting shank 15, while the remaining length of rod 10 is the working part by means of which the solder is actually applied. Within the working part of the implement the rod 10 defines a base portion 20 and a tapered portion 25 whose extremity forms a working tip 26.

Supporting shank 15 has a cylindrical surface 16 whose diameter is designated as 17. A seamless cylindrical stainless steel sleeve 30 is mounted on the supporting shank 15 and permanently fastened thereto. Sleeve 30 has a cylindrical inner surface 31 and a cylindrical outer surface 32 which together define a wall having a uniform radial thickness throughout. In this wall, which is relatively thin, indentations 35, 36 are formed after the sleeve is mounted on shank 15, the indentations in the sleeve wall producing corresponding indentations in the cylindrical surface 16 of the shank 15 so as to permanently fasten the sleeve thereon.

The advantages of the stainless steel sleeve are that it has sufficient tensile strength to restrain a heated supporting shank from expanding radially within the electric iron, as well as having a very high resistance to corrosion, erosion, and oxidation. Thus, use of the stainless steel sleeve avoids any tendency for the soldering tip to stick or freeze within the opening in the electric iron that is to receive the combination of supporting shank and stainless steel sleeve. On the other hand, the stainless steel is a less efficient heat conductor than the copper, hence the thickness and length of the sleeve are carefully limited. More specifically, the length of the stainless steel sleeve is limited so that it is exactly the same length as the opening in the electric iron that is to receive it. For best results the radial thickness of the sleeve is preferably limited in accordance with the following table.

| Shank diameter in inches: | Sleeve thickness in 1/1000 inches |
|---|---|
| 1/8 to 3/16 | 5 to 6 |
| 1/4 to 3/8 | 7 to 10 |
| 5/8 or more | 10 |

In the working part of the soldering tip the base portion 20 of the copper rod 10 defines a cylindrical surface 21. The diameter 23 of cylindrical surface 21 of the base portion 20 is substantially smaller than diameter 17 of supporting shank 15. At one end the base portion 20 adjoins the supporting shank 15, and is there provided with an outwardly flared rounded surface portion 22. Tapered portion 25 projects from the other end of base portion 20. While a particular configuration of the tip 26 is illustrated herein it will be understood that the tip may be sharp, blunt, or of any other desired configuration.

A coating 40 of electrolytically deposited iron completely covers the surface of base portion 20 and tapered portion 25, including the flared end 22 of base portion 20 and tip 26 at the extremity of the tapered portion 25. A silver coating 50 covers the entire exterior surface of the iron coating 40. Iron coating 40 has an appreciable thickness, as will be discussed, while silver coating 50 is preferably less than one one-thousandth of an inch thick, and is therefore applied as a flash coating.

The coated surface 40, 50 has many advantages in manipulating the molten solder. Silver coating 50 has an affinity or attraction for the solder and hence provides very efficient heat transfer so that the solder will melt and flow quite easily. While excess silver might tend to melt and become assimilated with the solder, the thin coating utilized in accordance with the invention is securely retained on the surface of the iron coating 40. The iron coating 40 in turn protects the copper from damage while at the same time providing a suitable base for the silver coating 50.

It has been found that the thickness of iron coating 40 is rather critical, however. If the coating is made too thick the heat conductivity of the soldering tip is reduced so greatly as to seriously interfere with its usefulness. If the iron coating is made too thin it does not provide adequate protection for the copper, and the useful life of the soldering tip is seriously reduced. The heat carrying capacity of the soldering tip is primarily a function of the diameter of base portion 20, hence the preferred range for the thickness of iron coating 40 relative to the diameter of base portion 20 is expressed in the following table.

| Diameter of base portion in inches: | Coating thickness in 1/1000 inches |
|---|---|
| 1/16 | 2 to 3 |
| 1/8 | 3 to 5 |
| 3/16 | 5 to 7 |
| 1/4 | 5 to 7 |
| 3/8 | 6 to 8 |
| 5/8 or more | 8 to 10 |

A high degree of non-porosity of iron coating 40 is an essential feature of the preferred form of the invention. In the practice of the present invention it has been found that by keeping the purity of the iron coating to at least 99.6%, and correspondingly limiting the impurities to 0.4% or less, vastly superior results are achieved. The soldering tip is more efficient in operation and has a substantially longer useful life.

The theoretical consideration for the unusual and beneficial results obtained through the use of the coated surface appears to be that the silver deposit 50 forms a metallic solid solution with the top layers of the iron coating 40. The solid solution thus formed has an affinity or attraction for the solder and also provides efficient heat transfer so that the solder will melt and flow quite easily over the tapered surface of the soldering tip. The very small quantity of silver used probably results in the entire amount entering into solid solution with the iron. This, then, causes the iron lattice to be strengthened, much in the same manner as carbon "case-hardens" iron. Thus, the useful life of the soldering tip is greatly increased.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What I claim is:

1. A soldering tip for use with electric soldering irons, comprising:

an elongated solid copper rod including a cylindrical portion forming a supporting shank, and a working part consisting of a base portion that projects from one end of said supporting shank and a tapered portion which extends from the other end of said base portion;

successive coatings of electrolytically deposited metals that cover the surface of said working part, the first being a uniform deposit of iron having a thickness selected in proportion to the diameter of said base portion of the working part, the final coat being silver;

and a seamless cylindrically shaped stainless steel sleeve that encompasses the entire surface area of said supporting shank and is permanently mounted thereon, said stainless steel sleeve having a uniform thickness selected in proportion to the diameter of said supporting shank so as to inhibit radial expansion thereof and being adapted for close-fitted complete insertion within an electric soldering iron in easily removable and non-sticking relationship therewith.

2. A soldering tip as claimed in claim 1 wherein at least one depression is formed in the exterior surface of said sleeve for retaining same on said supporting shank.

References Cited in the file of this patent

UNITED STATES PATENTS

| 1,291,388 | Bright et al. | Jan. 14, 1919 |
| 1,904,241 | Kammerer | Apr. 18, 1933 |
| 1,988,827 | Bennett | Jan. 22, 1935 |
| 2,035,686 | Briegel | Mar. 31, 1936 |
| 2,213,438 | Young | Sept. 3, 1940 |
| 2,311,776 | Powell | Feb. 23, 1943 |
| 2,523,638 | Tice | Sept. 26, 1950 |
| 2,588,531 | Johnson | Mar. 11, 1952 |

FOREIGN PATENTS

| 227,448 | Great Britain | May 28, 1925 |
| 487,178 | Great Britain | June 16, 1938 |
| 674,661 | Great Britain | Mar. 9, 1950 |